US012582213B2

(12) United States Patent
Chikazawa et al.

(10) Patent No.: US 12,582,213 B2
(45) Date of Patent: Mar. 24, 2026

(54) BEAUTY EQUIPMENT

(71) Applicant: Panasonic Intellectual Property Management Co., Ltd., Osaka (JP)

(72) Inventors: Yuki Chikazawa, Nara (JP); Hirotoshi Oikaze, Shiga (JP); Masato Kinoshita, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 307 days.

(21) Appl. No.: 18/254,533

(22) PCT Filed: Dec. 24, 2021

(86) PCT No.: PCT/JP2021/048145
§ 371 (c)(1),
(2) Date: May 25, 2023

(87) PCT Pub. No.: WO2022/168488
PCT Pub. Date: Aug. 11, 2022

(65) Prior Publication Data

US 2024/0099442 A1 Mar. 28, 2024

(30) Foreign Application Priority Data

Feb. 5, 2021 (JP) ................................ 2021-017277

(51) Int. Cl.
*B05B 7/04* (2006.01)
*A45D 20/12* (2006.01)
*A45D 34/04* (2006.01)

(52) U.S. Cl.
CPC ............. *A45D 34/04* (2013.01); *A45D 20/12* (2013.01); *B05B 7/0483* (2013.01)

(58) Field of Classification Search
CPC .... A45D 34/04; A45D 20/12; A45D 2200/20; B05B 7/0483; B05B 7/0081; B05B 7/04; B05B 7/0416
See application file for complete search history.

(56) References Cited

U.S. PATENT DOCUMENTS 3,921,857 A * 11/1975 Riccio .................... B65D 83/60 222/145.5
6,042,026 A 3/2000 Buehler
(Continued)

FOREIGN PATENT DOCUMENTS

CN 2910373 Y 6/2007
JP 2018-196862 A 12/2018
JP 06681575 B2 4/2020

OTHER PUBLICATIONS

International Search Report issued on Mar. 8, 2022 in International Patent Application No. PCT/JP2021/048145, with English translation.

*Primary Examiner* — Qingzhang Zhou
(74) *Attorney, Agent, or Firm* — Rimon P.C.

(57) ABSTRACT

A hair care device includes a sprayer disposed inside the housing. The sprayer includes a tank that stores therein liquid, two-fluid nozzle that discharges atomized liquid, a liquid feed pump that feeds liquid from the tank into two-fluid nozzle, and an air pump that is connected to two-fluid nozzle. Two-fluid nozzle includes first orifice unit for mixing the liquid from liquid supply channel with the air from air supply channel to atomize the liquid, and mist release port for discharging the liquid atomized in first orifice unit. Second orifice unit having an inner diameter larger than the inner diameter of first orifice unit is provided between first orifice unit and mist release port.

7 Claims, 3 Drawing Sheets

(56) References Cited

U.S. PATENT DOCUMENTS

2013/0181064 A1* 7/2013 Sardo .................... B05B 7/1613
239/69
2018/0339303 A1* 11/2018 Inoue .................... B05B 9/0822

* cited by examiner

BEAUTY EQUIPMENT

CROSS-REFERENCE OF RELATED APPLICATIONS

This application is the U.S. National Phase under 35 U.S.C. § 371 of International Patent Application No. PCT/JP2021/048145, filed on Dec. 24, 2021, which in turn claims the benefit of Japanese Patent Application No. 2021-017277, filed on Feb. 5, 2021, the entire disclosures of which Applications are incorporated by reference herein.

TECHNICAL FIELD

The present disclosure relates to a beauty equipment.

BACKGROUND ART

PTL 1 discloses a beauty equipment including a sprayer. This beauty device includes a tank that stores therein liquid, a nozzle that discharges atomized liquid, a pump that feeds the liquid from the tank into the nozzle, and a detector that detects the direction of the sprayer. Based on the direction of the sprayer detected by the detector, a controller adjusts the pump output.

CITATION LIST

Patent Literature

PTL 1: Unexamined Japanese Patent Publication No. 2018-196862

SUMMARY OF THE INVENTION

Because the conventional beauty equipment cannot cope with the output fluctuation of the pump that feeds the liquid (liquid feed pump), there are chances that the amount sprayed out of the sprayer does not stabilize, and the conventional beauty equipment fails to supply an appropriate amount of liquid to a user.

The present disclosure provides a beauty equipment provided with a sprayer capable of discharging liquid stably without being affected by a fluctuation in the amount of liquid fed by a liquid feed pump.

A beauty equipment according to an aspect of the present disclosure includes a housing having an intake port and a discharge port, and a sprayer disposed inside the housing. The sprayer includes a reservoir that stores therein liquid, a two-fluid nozzle that discharges the atomized liquid, a liquid feed pump that feeds the liquid from the reservoir to the two-fluid nozzle, and an air pump connected to the two-fluid nozzle. The two-fluid nozzle includes a liquid supply channel into which the liquid from the liquid feed pump is supplied, and an air supply channel into which the air from the air pump is supplied. The two-fluid nozzle includes a first orifice unit for mixing the liquid from the liquid supply channel with the air from the air supply channel to atomize the liquid, and a mist release port for discharging the liquid atomized by the first orifice unit. Provided between the first orifice unit and the mist release port is a second orifice unit having an inner diameter larger than an inner diameter of the first orifice unit.

According to the present disclosure, it is possible to provide a beauty equipment provided with a sprayer capable of discharging liquid stably without being affected by a fluctuation in the amount of liquid fed by a liquid feed pump.

DESCRIPTION OF EMBODIMENT

Exemplary embodiments will now be explained in detail with reference to the drawings. However, descriptions more in details than necessary are sometimes omitted. For example, detailed descriptions of well-known matters or redundant descriptions of substantially the same configurations may be omitted.

Note that the accompanying drawings and the following description are provided for those skilled in the art to fully understand the present disclosure, and are not intended to limit the subject matter described in the claims in any way.

A beauty equipment (hair care device 1) according to the present exemplary embodiment will now be explained with reference to FIGS. 1 to 4.

[1. Configuration]

To begin with, a configuration of hair care device 1 according to the present exemplary embodiment will be explained.

Hair care device 1 according to the present exemplary embodiment is one example of the beauty equipment according to the present disclosure, and, in the present exemplary embodiment, is a hair dryer.

Figure 1:
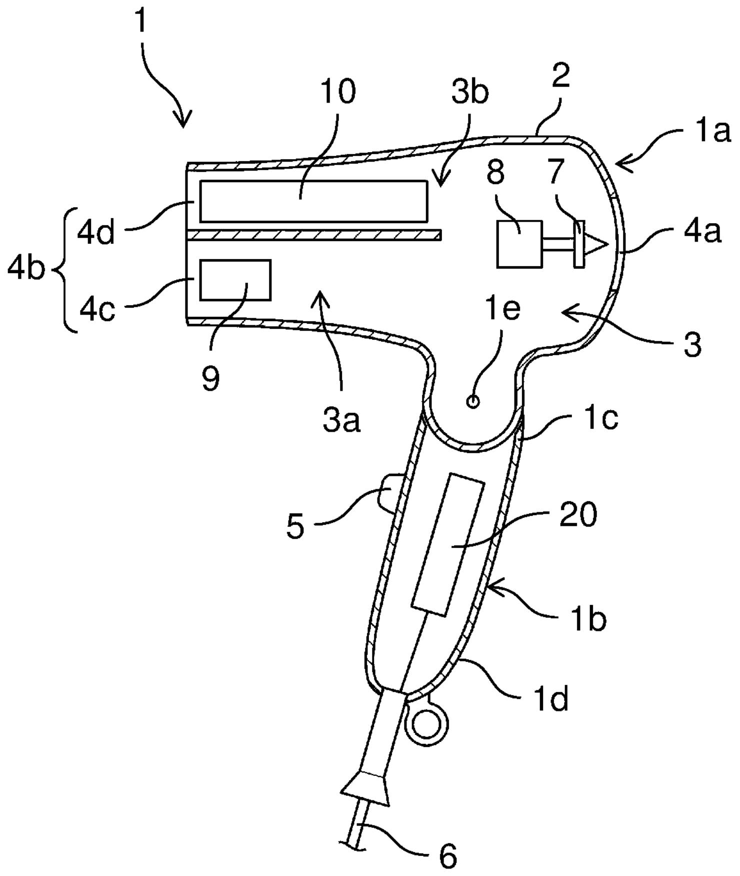
FIG. 1 is a diagram illustrating a basic configuration of beauty equipment (hair care device) according to an exemplary embodiment.

FIG. 1 is a diagram illustrating a basic configuration of beauty equipment (hair care device 1) according to an exemplary embodiment.

As illustrated in FIG. 1, hair care device 1 includes body 1*a* and handle 1*b*. Body 1*a* has housing 2 delineating an outer frame, and cavity 3 is provided inside housing 2. Cavity 3 has air flow channel 3*a* extending between intake port 4*a* provided on one side (right side in FIG. 1) of the longitudinal direction (left-right direction in FIG. 1), and discharge port 4*b* provided on the other side (left side in FIG. 1). Discharge port 4*b* includes warm air discharge port 4*c* and mist discharge port 4*d* through which warm air and mist are blown out of hair care device 1, respectively.

Handle 1*b* serving as a portion gripped by a user is coupled to a lower portion of housing 2, in a manner extending in a direction intersecting with the longitudinal direction of body 1*a*. Hair care device 1 is configured in such a manner that body 1*a* and handle 1*b* delineates a substantially T-shaped or L-shaped (in the present exemplary embodiment, substantially T-shaped) outer appearance during the use.

Handle 1*b* has base end 1*c* that is on the side of body 1*a*, and proximal end 1*d*. Slidable power switch 5 is provided to a side surface of handle 1*b*, and power cord 6 extends from a protruding end (proximal end 1*d*) of handle 1*b*. Connecting part 1*e* rotatably connects base end 1*c* of handle 1*b* to body 1*a*. As a result, hair care device 1 can be folded to a position where proximal end 1*d* lies along body 1*a*.

Provided upstream (the side nearer to intake port 4*a*) of air flow channel 3*a* inside body 1*a* are fan 7 and motor 8 that are examples of an air blower.

Heater 9 that is an example of a heater for heating the air blown out of fan 7 is disposed on downstream of fan 7 (a side nearer to discharge port 4*b* than fan 7). Heater 9 is provided as winding of corrugated strip-shaped electric resistor disposed along the inner periphery of air flow channel 3*a*, for example.

On top of (above) air flow channel 3*a*, branched air flow channel 3*b* is provided separately from air flow channel 3*a*. Inside branched air flow channel 3*b*, components of sprayer 10 according to the present exemplary embodiment are disposed. A configuration of sprayer 10 will be described later in detail with reference to FIG. 2.

In the present exemplary embodiment, control unit 20 that supplies power to and controls operation of power-operated components, such as motor 8, heater 9, and sprayer 10, is disposed inside handle 1*b*. Note that electric circuits for supplying power to components and controlling the operations thereof may be integrated into one substrate, or may be distributed across a plurality of substrates.

Sprayer 10 included in hair care device 1 having the structure described above will now be explained with reference to FIG. 2.

Figure 2:
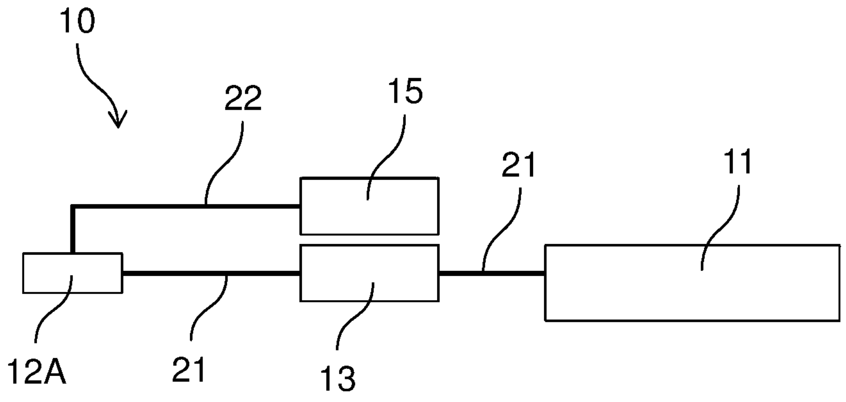
FIG. 2 is a block diagram illustrating a basic configuration of a sprayer.

FIG. 2 is a block diagram illustrating a basic configuration of sprayer 10. As illustrated in FIG. 2, sprayer 10 includes tank 11 as a reservoir where liquid is stored, two-fluid nozzle 12A as a nozzle through which atomized liquid is discharged, and liquid feed pump 13 that feeds liquid supplied from tank 11 into two-fluid nozzle 12A. Sprayer 10 also includes air pump 15 that is connected to two-fluid nozzle 12A.

Figure 3:
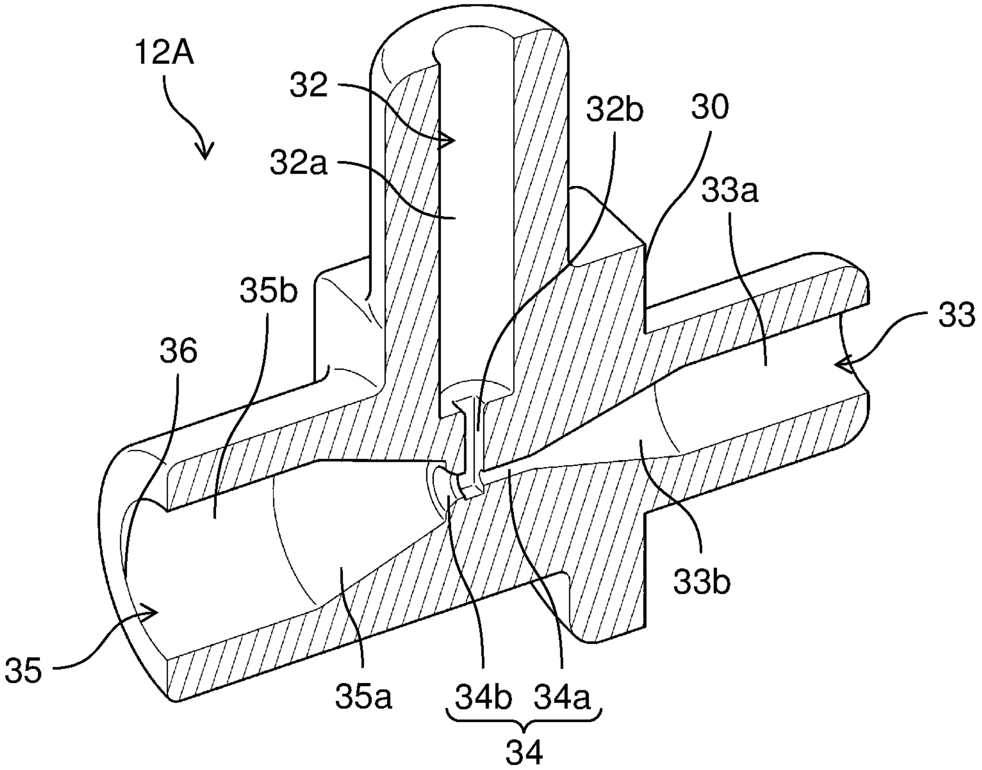
FIG. 3 is a breakaway perspective view illustrating a configuration of a two-fluid nozzle.
Figure 4:
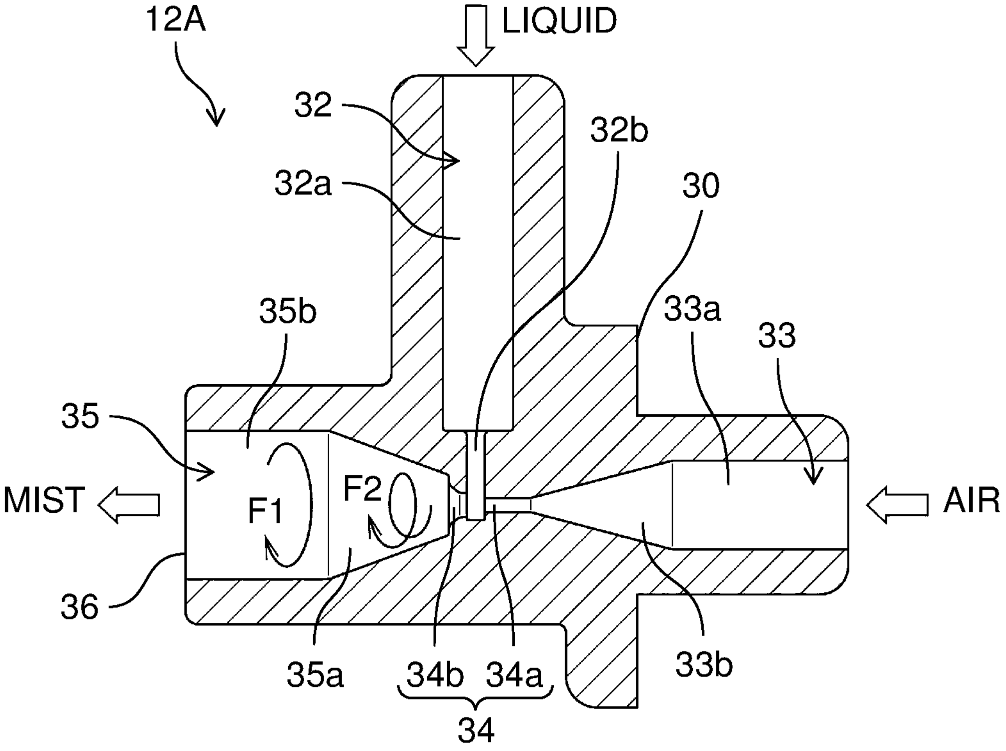
FIG. 4 is a cross-sectional side view illustrating the configuration of the two-fluid nozzle illustrated in FIG. 3.

Liquid supply channel 32 into which the liquid feed pump 13 supplies the liquid and air supply channel 33 into which air pump 15 supplies air are formed inside of two-fluid nozzle 12A (see FIGS. 3 and 4).

Also provided inside two-fluid nozzle 12A are first orifice unit 34 and second orifice unit 35 that are mixing spaces for mixing the liquid from liquid supply channel 32 with the air from air supply channel 33 to atomize the liquid (see FIGS. 3 and 4).

Liquid tube 21 communicatively connects liquid supply channel 32 provided inside two-fluid nozzle 12A to tank 11, and liquid feed pump 13 is positioned in the middle of the liquid tube 21.

Tank 11 is a bag-shaped container (pouch) made of a flexible laminate film, for example. Liquid feed pump 13 is, for example, a tube pump that feeds liquid by nipping liquid tube 21 between a roller and a base.

Air tube 22 communicatively connects air supply channel 33 inside two-fluid nozzle 12A to air pump 15.

The liquid mixed and atomized (mist) in the mixing spaces (first orifice unit 34 and second orifice unit 35) inside two-fluid nozzle 12A is sprayed outside via mist release port 36 of two-fluid nozzle 12A (see FIGS. 3 and 4).

Two-fluid nozzle 12A included in sprayer 10 will now be explained with reference to FIGS. 3 and 4. FIG. 3 is a breakaway perspective view illustrating the configuration of two-fluid nozzle 12A, and FIG. 4 is a side sectional view illustrating the configuration of two-fluid nozzle 12A illustrated in FIG. 3.

As illustrated in FIGS. 3 and 4, two-fluid nozzle 12A has body 30. Body 30 has liquid supply channel 32, air supply channel 33, first orifice unit 34, second orifice unit 35, and mist release port 36.

Body 30 of two-fluid nozzle 12A is made from a metal material or a synthetic resin material, for example.

Liquid tube 21 is connected to an inlet-side end of liquid supply channel 32. An outlet-side end of liquid supply channel 32 opens to and is connected to a midpoint of first orifice unit 34. In the present exemplary embodiment, liquid supply channel 32 is connected orthogonally to constant diameter portion 34*a* of first orifice unit 34.

Liquid supply channel 32 has a large-diameter portion (large cross-sectional area portion) 32*a* that forms an inlet-side portion of liquid supply channel 32, and the inner diameter (cross-sectional area) of which is constant. Liquid supply channel 32 has a small-diameter portion (small cross-sectional area portion) 32*b* that forms an outlet-side portion of liquid supply channel 32, and the inner diameter (cross-sectional area) of which is constant and smaller than that of large-diameter portion (large cross-sectional area portion) 32*a*.

Air tube 22 is connected to an inlet-side end of air supply channel 33, and an outlet-side end of air supply channel 33 is connected to first orifice unit 34.

Air supply channel 33 has constant diameter portion (constant cross-sectional area portion) 33*a* that forms an inlet-side portion of air supply channel 33, and the inter diameter (cross-sectional area) of which is constant. Air supply channel 33 has decreasing diameter portion (decreasing portion) 33*b* that forms an outlet-side portion of air supply channel 33, and the inner diameter (cross-sectional area) of which decreases in a direction from the inlet toward the outlet.

First orifice unit 34 has constant diameter portion (constant cross-sectional area portion) 34*a* that forms an inlet-side portion of first orifice unit 34, and the inner diameter (cross-sectional area) of which is constant. First orifice unit 34 also has increasing diameter portion (increasing portion) 34*b* that forms an outlet-side portion of first orifice unit 34, and the inner diameter (cross-sectional area) of which increases in a direction from the inlet side toward the outlet side.

Second orifice unit 35 is provided between first orifice unit 34 and the mist release port 36, and has an orifice diameter larger than the orifice diameter of the first orifice unit 34.

Second orifice unit 35 has increasing diameter portion (increasing portion) 35*a* that forms an inlet-side portion of second orifice unit 35 and the inner diameter (cross-sectional area) of which increases in a direction from first orifice unit 34 toward mist release port 36. Second orifice unit 35 has constant diameter portion (constant cross-sectional area portion) 35*b* that forms an outlet side portion of second orifice unit 35, and the inner diameter (cross-sectional area) of which is constant.

[3. Effects, Etc.]

Operational effects according to the present exemplary embodiment will now be explained.

(1) In the present exemplary embodiment, hair care device 1 includes housing 2 having intake port 4*a* and discharge port 4*b*, and sprayer 10 disposed inside housing 2. Sprayer 10 includes tank 11 that stores therein liquid, two-fluid nozzle 12A that discharges atomized liquid, liquid feed pump 13 that feeds the liquid from tank 11 to two-fluid nozzle 12A, and air pump 15 connected to two-fluid nozzle 12A. Two-fluid nozzle 12A includes liquid supply channel 32 to which liquid feed pump 13 supplies liquid, and air supply channel 33 to which air pump 15 supplies the air. Two-fluid nozzle 12A includes first orifice unit 34 for mixing the liquid from liquid supply channel 32 with the air from air supply channel 33 to atomize the liquid, and mist release port 36 for discharging the liquid atomized in first orifice unit 34. Second orifice unit 35 having an inner diameter larger than the inner diameter of first orifice unit 34 is provided between first orifice unit 34 and mist release port 36. Hair care device 1 is an example of a beauty equipment according to the present disclosure, and tank 11 is an example of a reservoir according to the present disclosure.

When the amount of liquid fed by liquid feed pump 13 fluctuates and the amount of liquid supplied into two-fluid nozzle 12A increases, the liquid not having been atomized in first orifice unit 34 remains inside second orifice unit 35 as convection F1 (see FIG. 4). Therefore, hair care device 1 according to the present exemplary embodiment can suppress dripping in which liquid spurts out of two-fluid nozzle 12A.

In addition, because the orifice diameter of second orifice unit 35 is larger than the orifice diameter of first orifice unit 34, a negative pressure may be generated inside second orifice unit 35 due to densities of the flow velocity, external gas may flow in from the mist release port 36, and cause a turbulence. Hair care device 1 according to the present exemplary embodiment uses this turbulent flow to shear and to atomize the liquid having caused convection F1 inside second orifice unit 35.

In other words, hair care device 1 according to the present exemplary embodiment is a beauty equipment provided with sprayer 10, and can stably spray liquid without being affected by a fluctuation in the amount of liquid fed by liquid feed pump 13.

(2) Second orifice unit 35 has increasing diameter portion 35*a* the inner diameter of which increases in a direction from first orifice unit 34 toward mist release port 36.

Because swirling flow F2 is generated along the inner wall surface in second orifice unit 35, hair care device 1 according to the present exemplary embodiment can suppress decrease in the flow velocity inside second orifice unit 35, and allows the fluid to be sheared and to be atomized efficiently inside second orifice unit 35. In other words, hair care device 1 according to the present exemplary embodiment is a beauty equipment provided with sprayer 10, and can stably spray liquid without being affected by a fluctuation in the amount of liquid fed by liquid feed pump 13.

(3) Second orifice unit 35 has constant diameter portion 35*b* the inner diameter of which remains constant.

Because the flow inside second orifice unit 35 is rectified in constant diameter portion 35*b*, hair care device 1 according to the present exemplary embodiment can enhance the directivity of the mist sprayed out of the mist release port 36, and stably deliver the mist to a desired place.

Other Exemplary Embodiments

A beauty equipment (hair care device) according to another exemplary embodiment will now be explained with reference to FIGS. 5 and 6.

A sprayer included in a hair care device according to another exemplary embodiment is different from that of hair care device 1 according to the exemplary embodiment in including two-fluid nozzle 12B, instead of two-fluid nozzle 12A of sprayer 10 included in hair care device 1 according to the exemplary embodiment. Note that parts that are the same as those of hair care device 1 according to the exemplary embodiment illustrated in FIGS. 1 to 4 will be denoted by the same reference numerals, and a detailed description thereof will be omitted.

Figure 5:
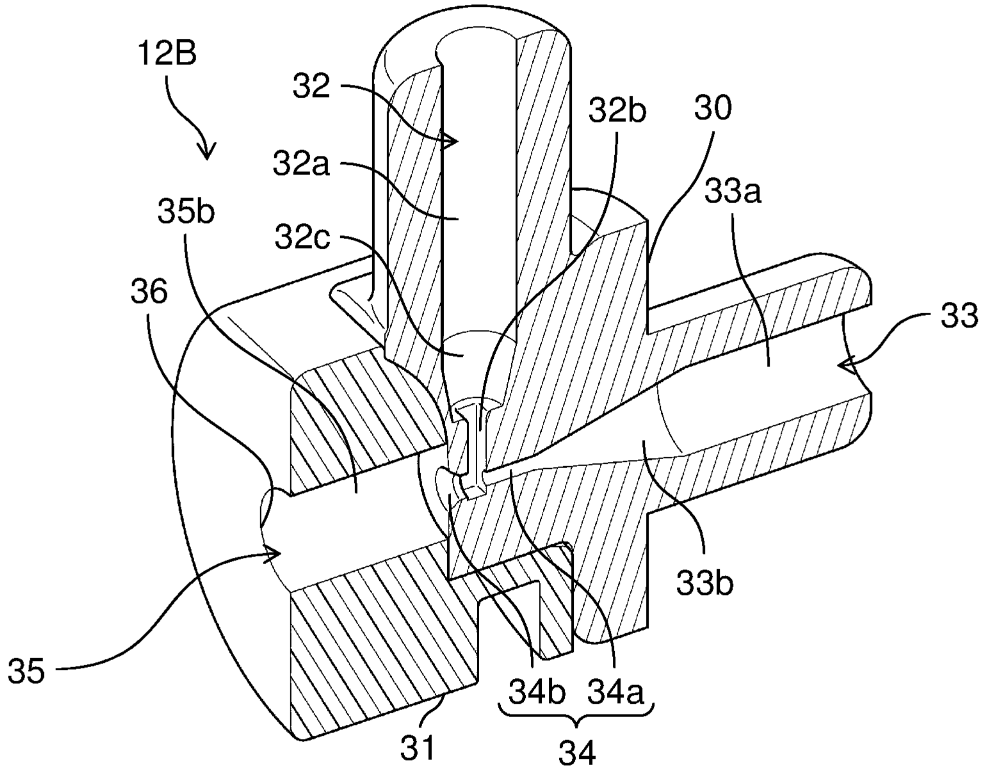
FIG. 5 is a breakaway perspective view illustrating a configuration of a two-fluid nozzle according to another exemplary embodiment.
Figure 6:
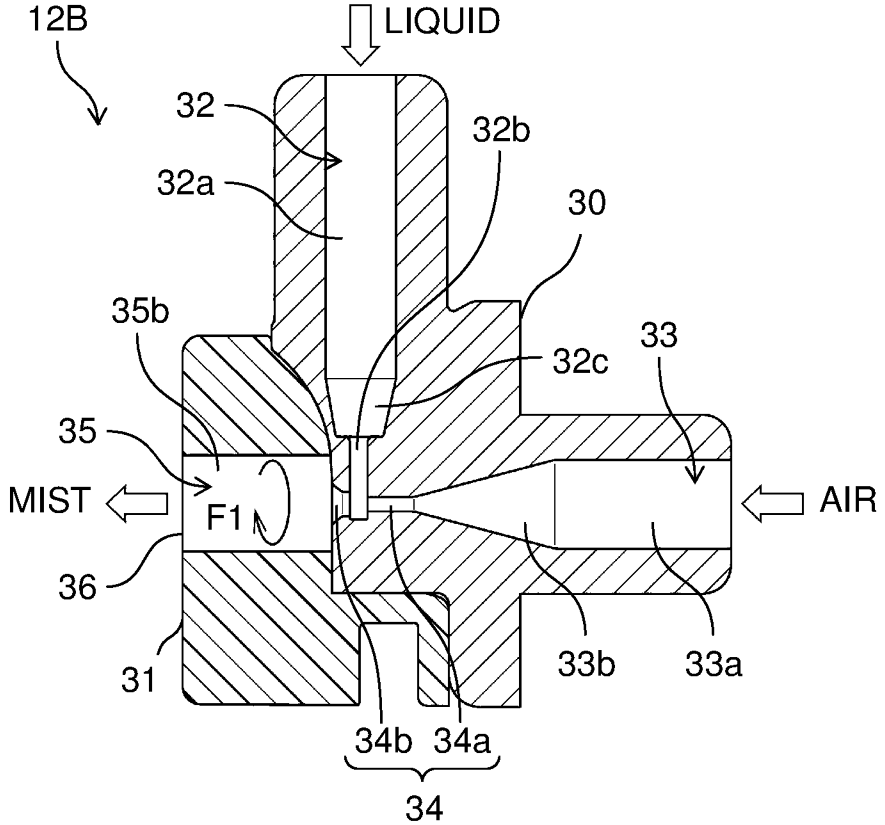
FIG. 6 is a cross-sectional side view illustrating the configuration of the two-fluid nozzle illustrated in FIG. 5.

FIG. 5 is a breakaway perspective view illustrating a configuration of two-fluid nozzle 12B according to the other exemplary embodiment, and FIG. 6 is a cross-sectional side view illustrating the configuration of two-fluid nozzle 12B illustrated in FIG. 5. As illustrated in FIGS. 5 and 6, two-fluid nozzle 12B has body 30 and counterpart 31 that is joined to body 30 by press-fitting, for example. Liquid supply channel 32, air supply channel 33, and first orifice unit 34 are provided to body 30, and second orifice unit 35 and mist release port 36 are provided to counterpart 31.

Counterpart 31 of two-fluid nozzle 12B is made of a material having a higher thermal expansion coefficient than that of the material of which body 30 is made. Counterpart 31 is made of, for example, silicone rubber or resin.

In the exemplary embodiment illustrated in FIGS. 5 and 6, second orifice unit 35 has constant diameter portion 35*b* only, and does not have increasing diameter portion 35*a*.

In the exemplary embodiment illustrated in FIGS. 5 and 6, decreasing diameter portion (decreasing portion) 32*c* the inner diameter (cross-sectional area) of which decreases in a direction from the inlet toward the outlet is provided between large-diameter portion (large cross-sectional area portion) 32*a* and small-diameter portion (small cross-sectional area portion) 32*b* of liquid supply channel 32.

Actions and effects achieved by the exemplary embodiment illustrated in FIGS. 5 and 6 will now be explained.

(1) In this exemplary embodiment, two-fluid nozzle 12B includes body 30 including first orifice unit 34, and counterpart 31 including second orifice unit 35.

With the hair care device according to the present exemplary embodiment, second orifice unit 35 can be replaced with one having a different shape, without removing body 30 (first orifice unit 34) that is joined and fixed to the hair care device, and therefore, can be configured to spray various liquids.

In addition, with the hair care device according to this exemplary embodiment, second orifice unit 35 can be replaced with one having a different orifice diameter, when it is desirable to adjust the particle diameter of the mist to be sprayed out of two-fluid nozzle 12B. In this manner, in the hair care device according to this exemplary embodiment, the flow rate inside second orifice unit 35 is changed, so that the particle diameter of the mist can be adjusted.

Furthermore, because counterpart 31 (second orifice unit 35) can be removed from body 30 (first orifice unit 34) that is joined and fixed to the hair care device according to this exemplary embodiment, the hair care device according to this exemplary embodiment enables easy maintenance of first orifice unit 34.

(2) Counterpart 31 is made of a material having a higher thermal expansion coefficient than that of the material body 30 is made from.

Liquid generally becomes less viscous at a higher temperature, and more viscous at a lower temperature.

Because less viscous liquid spreads easily, it is preferable that there is a long distance between the inlet and the outlet (mist release port 36) of second orifice unit 35. In addition, because convection F1 of the liquid occurs easily inside second orifice unit 35, second orifice unit 35 preferably has a large diameter.

Counterpart 31, which is formed of a material having a high thermal expansion coefficient, is temperature-dependent and deforms easily. Therefore, when the temperature rises, the length between the inlet and the outlet (mist release port 36) of second orifice unit 35 becomes longer, and the orifice diameter of second orifice unit 35 becomes larger.

At the same time, highly viscous liquid spreads less easily. Therefore, the length between the inlet and the outlet (mist release port 36) of second orifice unit 35 may be short. In addition, because convection F1 of the liquid occurs less easily inside second orifice unit 35, the orifice diameter of second orifice unit 35 is preferably small.

Counterpart 31, which is formed of a material having a high thermal expansion coefficient, is temperature-dependent and deforms easily. Therefore, when the temperature drops, the length between the inlet and the outlet (mist release port 36) of second orifice unit 35 becomes shorter, and the orifice diameter of second orifice unit 35 becomes smaller.

In short, second orifice unit 35 automatically deforms to a shape suitable for the viscosity of the liquid, in accordance with a change in the viscosity of the liquid resultant of a change in the temperature. Therefore, the hair care device according to this exemplary embodiment can atomize and spray the liquid without replacing the entire two-fluid nozzle 12B.

In other words, the beauty equipment according to the present disclosure is a hair dryer device provided with a liquid spraying unit. The hair dryer device includes a fluid nozzle unit that shears the liquid with the air, a liquid feed pump unit that feeds the liquid, a substance reservoir tank unit that stores therein a substance to be sprayed from a liquid spraying unit, and a blowing pump unit that feeds air. In the fluid nozzle unit, the second orifice unit having an orifice diameter equal to or larger than that of the first orifice unit is provided to the outlet of the first orifice unit through which the fluid flows. In the fluid nozzle unit described above, the first orifice unit and the second orifice unit are separate members, and are joined to each other. The hair dryer device includes a ground electrode that is provided on an end face of the second orifice unit, the end face being that on the side of the first orifice unit, and a high-voltage electrode that is provided on a nozzle face of the second orifice unit, and the first orifice unit and the second orifice unit are made of an insulator. Furthermore, the second orifice unit is detachable or replaceable. The second orifice unit is made of a material having a high thermal expansion coefficient. The second orifice unit is made of silicone rubber or resin.

Note that the exemplary embodiments described above are illustrative of the technology according to the present disclosure, and various changes, replacements, additions, omissions, and the like may be made within the scope of the claims or equivalents thereof.

INDUSTRIAL APPLICABILITY

The present disclosure is applicable to a beauty equipment provided with a sprayer, and is applicable to a hair care device or a hair dryer, for example.

REFERENCE MARKS IN THE DRAWINGS

1 hair care device (beauty equipment)
1*a* body
1*b* handle
1*c* base end
1*d* proximal end
1*e* connecting part
2 housing
3 cavity
3*a* air flow channel
3*b* branched air flow channel
4*a* intake port
4*b* discharge port
4*c* warm air discharge port
4*d* mist discharge port
5 power switch
6 power cord
7 fan
8 motor
9 heater
10 sprayer
11 tank (reservoir)
12A two-fluid nozzle (nozzle)
12B two-fluid nozzle (nozzle)
13 liquid feed pump
15 air pump
20 control unit
21 liquid tube
22 air tube
30 body
31 counterpart
32 liquid supply channel
32*a* large-diameter portion (large cross-sectional area portion)
32*b* small-diameter portion (small cross-sectional area portion)
32*c* decreasing diameter portion (decreasing portion)
33 air supply channel
33*a* constant diameter portion (constant cross-sectional area portion)
33*b* decreasing diameter portion (decreasing portion)
34 first orifice unit
34*a* constant diameter portion (constant cross-sectional area portion)
34*b* increasing diameter portion (increasing portion)
35 second orifice unit
35*a* increasing diameter portion (increasing portion)
35*b* constant diameter portion (constant cross-sectional area portion)
36 mist release port
F1 convection
F2 swirling flow

The invention claimed is:

1. Beauty equipment comprising:
a housing including an intake port and a discharge port; and
a sprayer that is disposed inside the housing, wherein:
the sprayer includes:
a reservoir that stores therein liquid;
a two-fluid nozzle that discharges atomized liquid generated by atomizing the liquid;
a liquid feed pump that feeds the liquid from the reservoir into the two-fluid nozzle; and
an air pump that is connected to the two-fluid nozzle, the two-fluid nozzle includes:
a liquid supply channel to which the liquid from the liquid feed pump is supplied;
an air supply channel to which air from the air pump is supplied;
a first orifice unit for mixing the liquid from the liquid supply channel with the air from the air supply channel to atomize the liquid;
a mist release port for discharging the liquid atomized in the first orifice unit; and
a second orifice unit provided between the first orifice unit and the mist release port, the second orifice unit has a minimum inner diameter at a connection point to the first orifice unit, which is larger than a maximum inner diameter of the first orifice unit at a connection point to the second orifice unit, wherein the two-fluid nozzle includes:

a body including the first orifice unit; and a counterpart including the second orifice unit, and the counterpart is formed of a material having a higher thermal expansion coefficient than a thermal expansion coefficient of a material of which the body is made.

2. The beauty equipment according to claim 1, wherein the second orifice unit has an increasing diameter portion having an inner diameter increasing in a direction from the first orifice unit to the mist release port.

3. The beauty equipment according to claim 1, wherein the second orifice unit has a constant diameter portion having an inner diameter that is constant.

4. Beauty equipment comprising:

a housing including an intake port and a discharge port; and a sprayer that is disposed inside the housing, wherein:

the sprayer includes:

a reservoir that stores therein liquid;

a two-fluid nozzle that discharges atomized liquid generated by atomizing the liquid;

a liquid feed pump that feeds the liquid from the reservoir into the two-fluid nozzle; and an air pump that is connected to the two-fluid nozzle, the two-fluid nozzle includes:

a liquid supply channel to which the liquid from the liquid feed pump is supplied;

an air supply channel to which air from the air pump is supplied;

a first orifice unit for mixing the liquid from the liquid supply channel with the air from the air supply channel to atomize the liquid;

a mist release port for discharging the liquid atomized in the first orifice unit; and a second orifice unit provided between the first orifice unit and the mist release port, the second orifice unit has a minimum inner diameter at a connection point to the first orifice unit, which is larger than a maximum inner diameter of the first orifice unit at a connection point to the second orifice unit, the liquid supply channel is connected to the first orifice unit at a connecting portion, the first orifice unit includes:

a constant diameter portion directly connected to an air supply channel side of the connecting portion, and having a constant inner diameter; and an increasing diameter portion directly connected to a second orifice side of the connecting portion, and comprising a portion having an inner diameter increasing in a direction from the connecting portion to the second orifice unit, and the liquid supply channel is connected to the first orifice between the constant diameter portion and the increasing diameter portion.

5. Beauty equipment comprising:

a housing including an intake port and a discharge port; and a sprayer that is disposed inside the housing, wherein:

the sprayer includes:

a reservoir that stores therein liquid;

a two-fluid nozzle that discharges atomized liquid generated by atomizing the liquid;

a liquid feed pump that feeds the liquid from the reservoir into the two-fluid nozzle; and an air pump that is connected to the two-fluid nozzle, the two-fluid nozzle includes:

a liquid supply channel to which the liquid from the liquid feed pump is supplied;

an air supply channel to which air from the air pump is supplied;

a first orifice unit for mixing the liquid from the liquid supply channel with the air from the air supply channel to atomize the liquid;

a mist release port for discharging the liquid atomized in the first orifice unit; and a second orifice unit provided between the first orifice unit and the mist release port, the second orifice unit has an inner diameter larger than an inner diameter of the first orifice unit, the two-fluid nozzle comprises:

a body including the first orifice unit; and a counterpart including the second orifice unit, and the counterpart is formed of a material having a higher thermal expansion coefficient than a thermal expansion coefficient of a material of which the body is made.

6. The beauty equipment according to claim 5, wherein the second orifice unit has an increasing diameter portion having an inner diameter increasing in a direction from the first orifice unit to the mist release port.

7. The beauty equipment according to claim 5, wherein the second orifice unit has a constant diameter portion having an inner diameter that is constant.

* * * * *